United States Patent [19]

Hanselmann

[11] Patent Number: 4,719,661
[45] Date of Patent: Jan. 19, 1988

[54] CLEANING DEVICE FOR MOTOR VEHICLE WINDOW PANES

[75] Inventor: Dieter Hanselmann, Remseck, Fed. Rep. of Germany

[73] Assignee: SWF Auto-Electric GmbH, Bietigheim-Bissingen, Fed. Rep. of Germany

[21] Appl. No.: 810,106

[22] Filed: Dec. 17, 1985

[30] Foreign Application Priority Data

Dec. 22, 1984 [DE] Fed. Rep. of Germany ....... 3447055

[51] Int. Cl.⁴ .................... B60S 1/28; B60S 1/38; B60S 1/04; B60S 1/46
[52] U.S. Cl. ................. 15/250.41; 15/250.40; 15/250.35; 15/250.04
[58] Field of Search .......... 15/250.41, 250.40, 250.42, 15/250.04, 250.16, 250.17, 250.35, 250.33, 250.19

[56] References Cited

U.S. PATENT DOCUMENTS

| | | | |
|---|---|---|---|
| 2,187,876 | 1/1940 | Ericson | 15/250.41 |
| 3,292,196 | 12/1966 | Windorf | 15/250.19 |
| 3,881,212 | 5/1975 | Regler | 15/250.04 |
| 4,339,839 | 7/1982 | Knights | 15/250.41 |
| 4,345,352 | 8/1982 | Terabayashi | 15/250.16 |
| 4,590,638 | 5/1986 | Beneteau | 15/250.42 |
| 4,611,364 | 9/1986 | Grubner | 15/250.41 |

FOREIGN PATENT DOCUMENTS

| | | | |
|---|---|---|---|
| 2619633 | 11/1977 | Fed. Rep. of Germany ... | 15/250.41 |
| 1217286 | 12/1970 | United Kingdom ............ | 15/250.16 |
| 1419345 | 12/1975 | United Kingdom ............ | 15/250.14 |

OTHER PUBLICATIONS

WO80/01153, 6/1980, WIPO (Trico-Folberth).

Primary Examiner—James Kee Chi
Attorney, Agent, or Firm—James B. Raden; Robert P. Seitter

[57] ABSTRACT

A windshield wiper assembly in addition to carrying the wiper blade, also carries an additional cleaning device which may be a brush, an ice scraper, or an additional blade through which washer fluid may be sprayed. The additional device is coupled with the wiper arm-and-blade assembly by means of a coupling which may be operated by an adjusting element. The additional part is only used, when it is really necessary and, in addition, serves to reduce pressure on the wiper arm-and-blade assembly in the parking position.

34 Claims, 5 Drawing Figures

CLEANING DEVICE FOR MOTOR VEHICLE WINDOW PANES

BACKGROUND OF THE INVENTION

The invention pertains to a windshield wiper system, in general, and to a windshield wiper system having a wiper and blade assembly and an auxiliary cleaning device, in particular.

A cleaning device of this kind shown in German petty Pat. No. 1,937,591 includes a sponge strip which is relatively hard in its lower area and which may be manually clamped onto the wiper blade by means of wire yokes. The end edge of the sponge strip is thereby flush with the end edge of the wiper lip of the wiper blade. The wiper lip is pivotally connected with the upper areas of the wiper blade via a narrow web. During wiping action the wiper lip must be swivelled relative to the upper areas of the wiper blade and only the longitudinal edges should be moved across the window pane to be cleaned if good cleaning is to be ensured. Swivelling of the wiper lip is not possible, because the relatively hard sponge strip stiffens the system in its lower area. Thus cleaning of the window pane is predominantly effected by the sponge strip. However, as is known, sponge strips do not optimally clean window panes. If the sponge strip becomes worn after a longer wiping service the wiper lip can indeed by swivelled, however then it is solely responsible for cleaning of the window pane.

As a matter of fact a sponge strip of this kind does not improve the cleaning effect of the wiper blade. Moreoveor the view through the window pane during the wiper operation is always impeded by the sponge strip. Furthermore the mounting and demounting of the additional part is inconvenient. This is why cleaning devices of this kind did not succeed in practice.

Another cleaning device is known from the German specification OS No. 2,736,606, in which a wind deflector strip is carried by a wiper arm moving in the same direction as the wiper arm-and-blade assembly. Thus the wiper blade always runs at the lee side of the wind deflector strip and is therefore protected from being lifted. In this case the view through the window pane is impeded by the additional part during all wiping cycles. However at low driving speeds the wind deflector strip is not really necessary, because no airstreams appear which are strong enough to lift the wiper blade. Because the wind deflector strip is always carried by the wiper blade, the drive means are heavily loaded. Such heavy loading can result in premature wear and at least requires a high amount of energy and a correspondingly large drive means.

SUMMARY OF THE INVENTION

In accordance with the invention, a windshield wiper assembly in addition to carrying the wiper blade, also carries an additional cleaning device which may be a brush, an ice scraper, or an additional blade through which washer fluid may be sprayed. The additional device is coupled with the wiper arm-and-blade assembly by means of a coupling which may be operated by an adjusting element. The additional part is only used, when it is really necessary and, in addition, serves to reduce pressure on the wiper arm-and-blade assembly in the parking position.

Further in accordance with the invention, the wiper arm and blade assembly may be relieved from contact pressure in at least the parking position thereby preserving the wiper blade lip and, during winter, reducing the likelihood of the wiper from freezing onto the windshield.

BRIEF DESCRIPTION OF THE DRAWING

The invention will be better understood from a reading of the following detailed description in conjunction with the drawing in which:

FIGS. 1 to 3 show a first cleaning device for the windshield 1 of a motor vehicle, which has a wiper arm-and-blade assembly 10 which, in the parking position, is substantially deposited between two parts of the vehicle body, namely the engine hood 2 and the front bulkhead 3, outside the wiping area.

Figure 1:
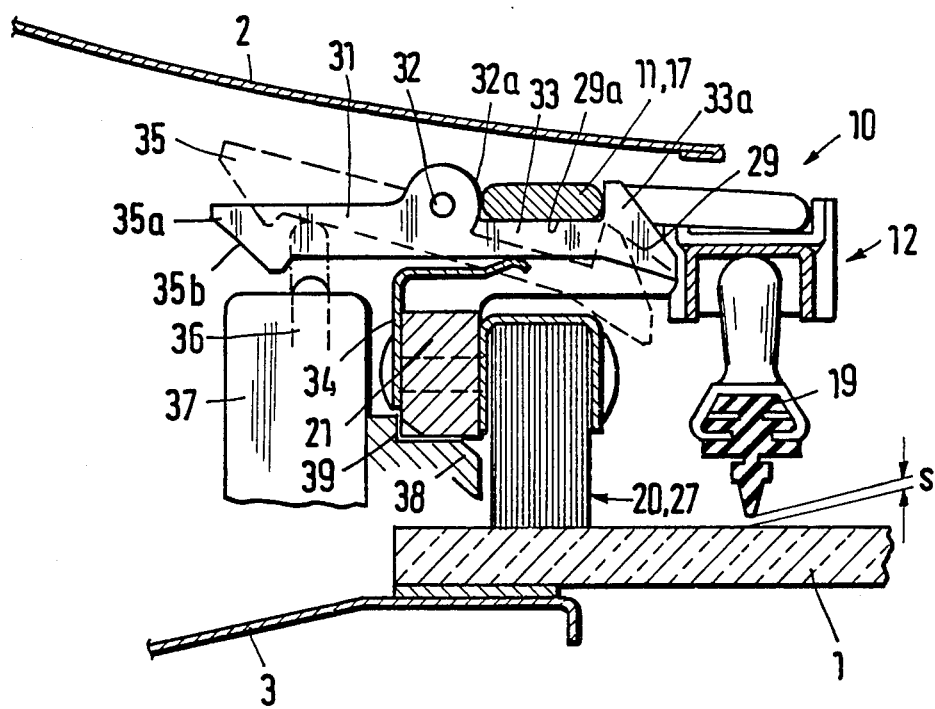
FIG. 1 is a side view, partly in cross-section, of a vehicle window cleaning apparatus embodying the present invention incorporating a first cleaning device in addition to the wiper blade.

The wiper arm-and-blade assembly 10 includes a wiper arm 11 and a wiper blade 12. On its one end the wiper arm 11 has a fastening member 14 connected with a wiper shaft 13 in a manner protected against twisting, to which fastening member is articulated a swivelling member 15 at 14a. The swivelling member 15 consists of a channel-shaped link 16 connected with a wiper rod 17 in a form-fit manner. Wiper blade 12 is articulated laterally to wiper rod 17. A tension spring 18 is suspended at the swivelling member 16 and at the fastening member 14. During wiper operation, tension spring 18 effects that the wiper rubber 19 of the wiper blade 12 glides across the windshield 1 with a certain pressure.

The window pane 1 can be cleaned, if necessary, instead of by the wiper blade 12 by means of a cleaning brush 20 movable by the same driving means as the wiper arm and blade assembly 10, which cleaning brush has approximately the same length as the wiper blade 12. In the parking position the cleaning brush 20 is positioned approximately in parallel to and with a small space from the wiper blade 12 between the motor hood and a spraying protection 3. The cleaning brush 20 is fixed at its top 21 to a rod-shaped portion of a guide arm 24 by means of a plugged fixation 22. The guide arm 24 extends laterally of the wiper arm 11 and is fitted onto the wiper shaft 13 by means of a fastening member 25 between the lower end of the wiper arm and the upper end of a bearing sleeve 13a surrounding the wiper shaft 13. The rod-shaped portion 23 is articulated to the fastening member 25 at 25a. A tension spring 26 is suspended at the fastening member 25 and the rod-shaped portion 23 of the guide arm 24, which tension spring effects the brushes 27 of the cleaning brush 20 to move across the window pane 1 with certain pressure, when in operation.

Onto the top 21 of the cleaning brush 20 is riveted a wedge-shaped part 28, which faces the wiper arm-and-blade assembly 11 with a surface 29 tapering towards the wiper arm-and-blade assembly. Wedge-shaped part 28 is divided at its center into two parts transversely to the longitudinal direction of the cleaning brush 20 and provided with a recess 30. In the recess 30 is mounted a two-armed catch 31 on the cleaning brush 20. Catch 31 is rotatable about an axle 32 extending in the longitudinal direction of the wiper arm-and-blade assembly. The first arm 33 is supported on the cleaning brush 20 via a leaf spring 34 fastened on one end of the top 21. Arm 33 has a hook-shaped end 33a which is upwardly curved and by means of which it can grip below the wiper rod 17. Arm 33 is just as long to the hook shaped end 33a as the wiper rod 17 is wide, so that the wiper arm-and-blade assembly 10 and the cleaning brush 20 may be connected with each other with little play transverse to the longitudinal direction. The second arm 35 of the catch 31 has a hook-shaped end 35a which is downwardly curved and against which arm a tappet 36 can rest. Tappet 36 can be pushed upward or downward by an adjusting element consisting of an electromagnet.

The electric control of the cleaning device is arranged such when the wiper operating switching is in the off position, the tappet 36 is moved into the upper positions shown by broken lines in FIG. 1 and presses catch 31 against the force of leaf spring 34 into the oblique position indicated by broken lines.

Wiper rod 17 runs over the tapered surface 29 of the position above straight surface 29a of the wedge-shaped part 28 of the cleaning brush 20. Then the catch 31 snaps into the position shown by solid lines in FIG. 1 due to the pressure exerted by the leaf spring. Arm 33 thereby grips wiper rod 17 from below. Thereby the wiper arm-and-blade assembly 10 is slightly elevated, so that the wiper rubber 19 is raised from the window pane 1 by a distance s. Thus the wiper rubber 19 is relieved from the contact pressure. As a matter of fact the wiper rubber can neither permanently deform nor freeze onto the window pane. As has furthermore been indicated in FIG. 1, when the cleaning brush 20 is in the parking position, its top 21 is supported on a wedge-shaped support 38, which has a recess with a stop face 39. The recess extends in the longitudinal direction of the brush. Thus the bristles 27 are not subjected to pressure when the brush is in the parking position and it is thereby ensured that the bristles 27 function properly for a long time.

The window pane 1 can now be cleaned with the cleaning device either by means of the wiper blade 12 or by means of the cleaning brush 20. If the wiper operating switch is brought into a certain on-position, tappet 36 is extended by the electromagnet 37. Then catch 31 again occupies the position shown by broken lines. The wiper arm-and-blade assembly 10 is drawn off the cleaning brush 20 by motion of the wiper shaft 13 in the opposite direction to the direction of parking, whereby the wiper rod 17 is drawn over the tapering-off surface 29 of the wedge-shaped part 28 of the cleaning brush 20. The wiper blade 12 thereafter occupies its normal working height. The cleaning brush 20 remains in the parking position, while the wiper blade 12 cleans the window pane 1.

When the driver starts the cleaning device by means of the wiper operating switch, the tappet 36 is pulled downward by electromagnet 37. The leaf spring 34 then presses the catch 31 into the position shown by solid lines in FIG. 1.

If at that time the wiper arm-and-blade assembly 10 is not on the wedge-shaped part 28 of the cleaning brush 20 it is pulled downwardly by means of the wiper shaft 13. Due to the relatively small strength of the leaf spring 34, catch 31 is pressed down by means of the wiper rod 17. Then the catch 31 snaps back into the position shown by solid lines. In this engaged position the wiper rod 17 carries the cleaning brush 20, while the wiper blade 12 is suspended above the window pane 1 at the spacing s.

At the end of a predetermined number of wiping cycles the wiper arm-and-blade assembly 10 together with the cleaning brush 20 is automatically moved into the parking position. Then tappet 36 is pushed upward by electromagnet 37 until it and catch 31 occupy the positions indicated by broken lines. The catch 31 can release the wiper rod 17, because due to the continuous to-and-fro motion of the wiper shaft the cleaning brush 20 is pushed against stop face 29 of the support 38 after the wiper rod 17 has hit the shoulder 32a of the catch bearing. Thereafter the wiper rod 17 is again drawn off the cleaning brush 20 because of the to-and-fro movement opposite to the parking direction and the window pane 1 is again cleaned by the wiper blade 12 until the driver puts the wiper operating switch into the off-position.

Thus the cleaning brush 20 is only used, if it is really necessary. Thus its long service life is ensured. It is alternatively used instead of the wiper blade 12, so that the wiper motor is not unnecessarily loaded. Moreover the view through the window pane 1 is not unnecessarily impeded by several parts moved across it. A flat construction is ensured by the lateral arrangement of wiper blade 12, wiper arm 11 and cleaning brush 20.

Figure 3:
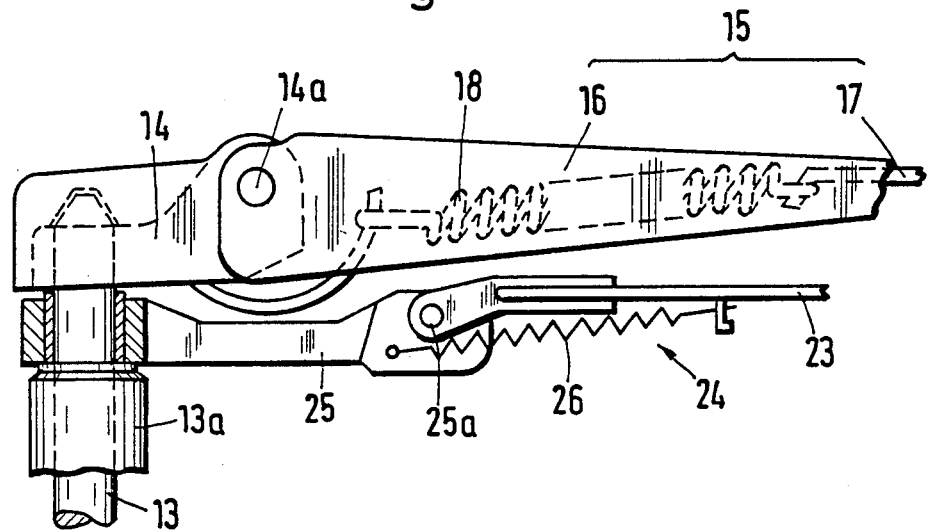
FIG. 3 is a partial front view of the driving end of the cleaning apparatus of FIG. 1 illustrating the drive shaft, the wiper arm for the wiper blade, and the guide arm for the additional device.
Figure 2:
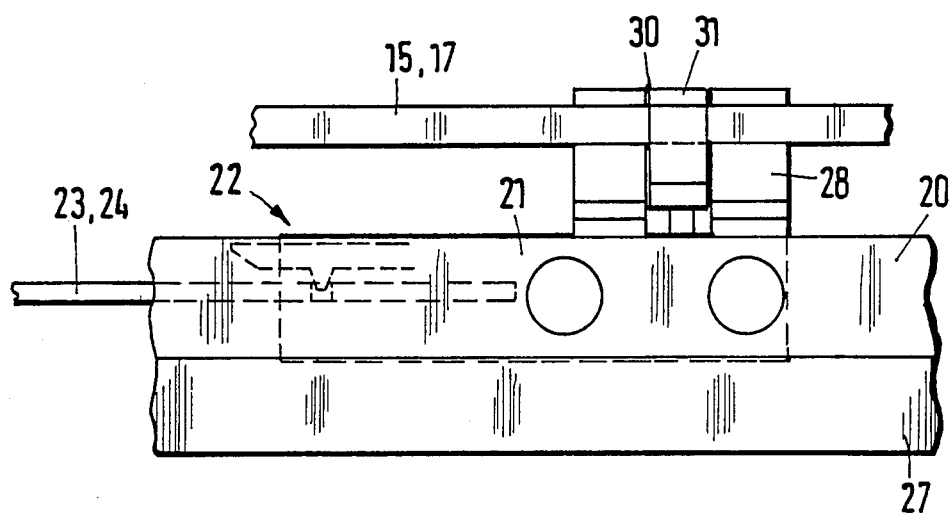
FIG. 2 is a front view of the cleaning apparatus of FIG. 1 with the wiper blade removed to more completely expose the cleaning apparatus.
Figure 4:
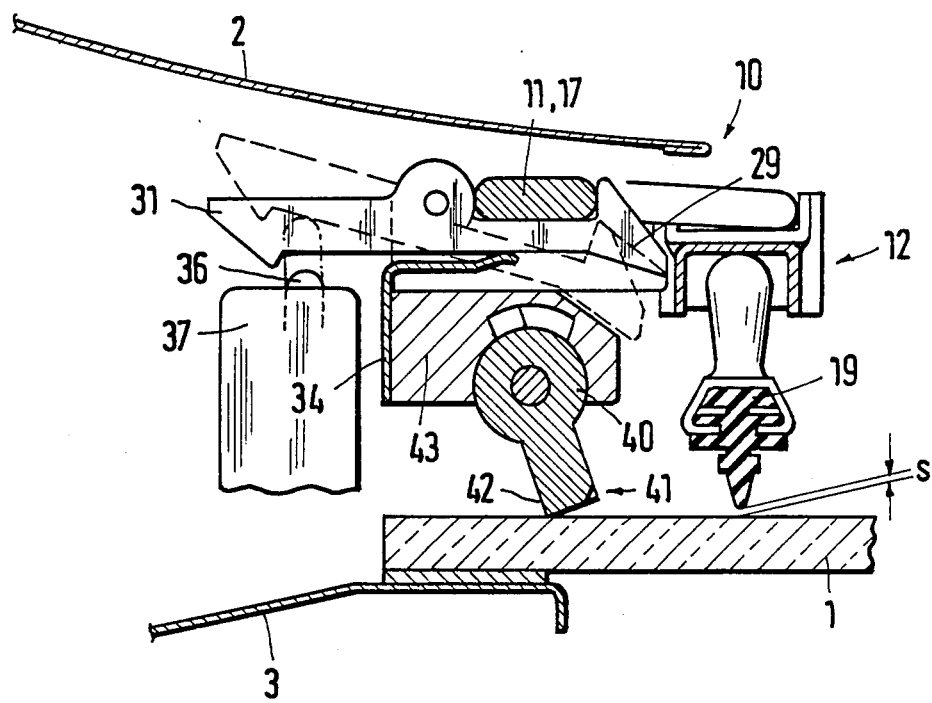
FIG. 4 is a side view, partly in cross-section, similar to FIG. 1, illustrating another vehicle window cleaning apparatus embodying the present invention incorporating a different additional cleaning device; an FIG. 5 is a side view, partly in cross-section, similar to FIG. 1, illustrating another vehicle window cleaning apparatus embodying the present invention incorporating a still different additional cleaning device.

Instead of the cleaning brush 20 other additional parts can also be used. In FIG. 4 a cleaning device with an ice-scraper strip 40 is shown. On its longitudinal side facing the wiper blade 12, the ice-scraper strip 40 has a toothed edge 41 by which can brake up an ice coating. Alongside its other longitudinal side the ice-scraper strip 40 has a scraper edge 42 by means of which the broken up ice coating can be scaped off during the upward to-and-fro motion. The ice-scraper strip 40 is suspended in a top 43 in a way that it is capable to be moved to and fro about its longitudinal axis, which top otherwise resembles to that shown in the cleaning device according to FIGS. 1 to 3. The other elements of the cleaning device are also formed like those of the preceding example. They are therefore provided with the same reference numerals in FIG. 4 and need not be described again.

Figure 5:
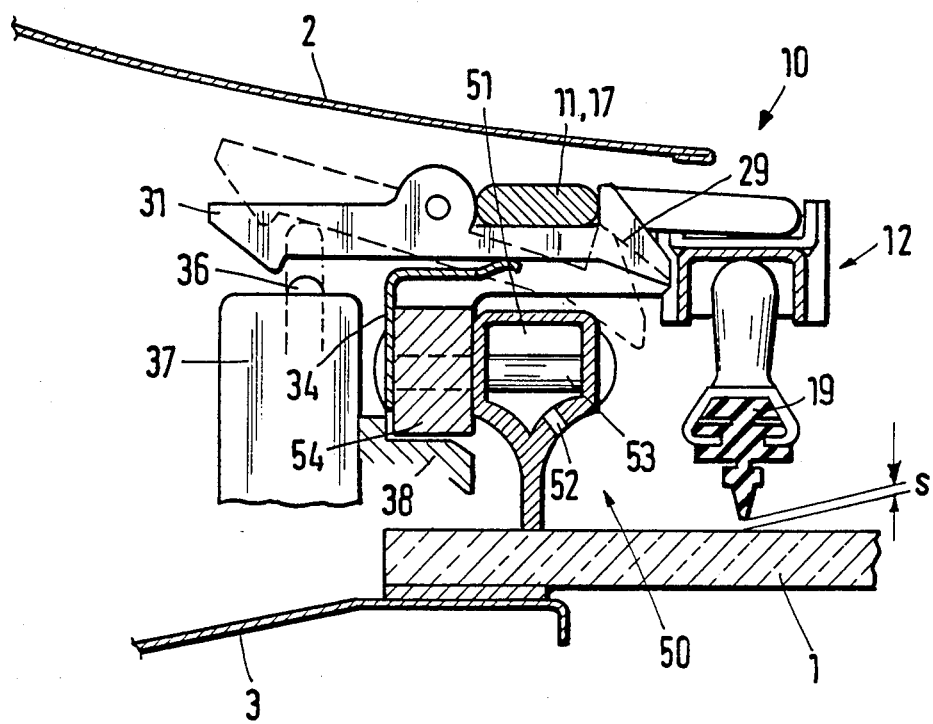

The same applies to the cleaning device shown in FIG. 5, which has a wiper element 50 consisting of a hard elastomer. This wiper element 50 has a head portion 51 formed as a hollow profile, which head portion can be filled with a detergent. The head portion 51 has lateral openings 52 through which the detergent can be brought onto the wiping area. Furthermore the head portion 51 is suspended on a top 54 by means of a hinged rivet 53 and may be moved in pendulum fashion about an axis extending perpendicularly to the wiping direction. The suspension of the head portion is thereby effected approximately central to its longitudinal direction. Thus the wiper element 50 is in a position to adapt to different window pane curvatures. This wiper element serves to remove intense dirt.

What is claimed is:

1. A vehicular window cleaning apparatus, comprising:
   a windshield wiper assembly including a wiper arm-and-blade and drive means for driving said wiper arm-and-blade;
   an additional part for intensifying the cleaning effect of said wiper blade;
   a coupling for coupling said additional part to said assembly for movement with said wiper arm-and-blade; and
   an adjusting element for operating said coupling to selectively couple said additional part to said assembly and uncouple said additional part therefrom.

2. A cleaning apparatus in accordance with claim 1, wherein:
   said additional part relieves said wiper arm-and-blade assembly from contact pressure against the window pane.

3. A cleaning apparatus in accordance with claim 1, wherein:
   said wiper arm-and-blade assembly and said additional part are moved to a parking position when not in use, said parking position being outside the wiping area between two vehicle parts.

4. A cleaning apparatus in accordance with claim 1, wherein:
   said coupling comprises a spring loaded structural unit which acts upon at least one of said wiper arm-and-blade assembly and said additional part.

5. A cleaning apparatus in accordance with claim 4, comprising:
   an actuator operable by said adjusting element; and
   wherein the spring force of said spring loaded structural unit is only so great, that it can overcome with the release of the coupling action by a change in the position of said actuator.

6. A cleaning apparatus in accordance with claim 3, comprising:
   a depositing element for supporting said additional part in said parking position.

7. A cleaning apparatus in accordance with claim 1, wherein:
   the coupling of said additional part with said wiper arm and blade assembly is automatically effected or prevented in dependence on certain measured parameters.

8. A cleaning apparatus in accordance with claim 1, comprising:
   an operating switch; and
   wherein the coupling of said additional part with said wiper arm-and-blade assembly is only effected in a particular switching position of said operating switch.

9. Cleaning apparatus in accordance with claim 1, comprising:
   a guide arm on which said additional part is mounted; and
   a shaft to which said guide arm is rotatably articulated and which drives said wiper arm-and-blade assembly in pendulum fashion;
   said guide arm moving in the same sense as said wiper arm-and-blade assembly when said additional part is coupled to said wiper arm-and-blade assembly.

10. Cleaning apparatus in accordance with claim 9, comprising:
    a bearing sleeve surrounding said shaft; and
    said guide arm being disposed between said wiper arm-and-blade assembly and said sleeve and holding said additional part lateral to said wiper blade.

11. A cleaning apparatus in accordance with claim 5, comprising:
    an axle mounted on said additional part and extending in the longitudinal direction of said wiper arm-and-blade assembly;
    said structural unit comprising a two-armed catch rotatable about said axle and a spring supporting a first arm of said catch on said additional part, said first arm having a hooked end and adapted to lockingly engage said wiper arm-and-blade assembly; and
    a tappet displaceable by said adjusting element, the second arm of said catch being movable by said tappet in a direction opposite to the direction of force of said spring.

12. A cleaning apparatus in accordance with claim 11, wherein:
    said second arm is pressed upward by said tappet when said additional part is not operated; and
    wherein said tappet is displaced downwardly for the purpose of coupling.

13. A cleaning apparatus in accordance with claim 11, comprising:
    an electromagnet for displacing said tappet.

14. A cleaning apparatus in accordance with claim 12, wherein:
    said additional part has a wedge-shaped, elevated portion, which faces said wiper arm-and-blade assembly with a surface tapering off towards the latter and that, for the purpose of coupling, a portion of said wiper arm-and-blade assembly is drawn across said surface.

15. A cleaning apparatus in accordance with claim 14, wherein:
    said wiper arm-and-blade assembly has a rod-shaped wiper arm end onto which said wiper blade is articulated, and wherein said catch grips below said rod-shaped end.

16. A cleaning apparatus in accordance with claim 14, wherein:
    said wiper arm-and-blade assembly comprising a supporting yoke system to guide the wiper rubber; and
    said catch grips below one yoke of said supporting yoke system.

17. A cleaning apparatus in accordance with claim 15, wherein:
    the lower end of the wiper rubber stands a predetermined distance above a vehicle part.

18. A cleaning apparatus in accordance with claim 17, wherein;
    said wiper blade is articulated lateral to said wiper arm.

19. A cleaning apparatus in accordance with claim 1, wherein:
    said additional part is a cleaning brush.

20. A cleaning apparatus in accordance with claim 1, wherein:
    said additional part is an ice-scraper strip, having a toothed edge at the longitudinal side facing said wiper blade and a scraper edge at the longitudinal side not facing said wiper blade, said ice-scraper strip being mounted in a holding device such that it may be moved in pendulum fashion about its longitudinal axis.

21. A cleaning apparatus in accordance with claim 1, wherein:
said additional part is a hard wiper rubber.

22. A cleaning apparatus in accordance with claim 1, wherein:
said additional part is a wind deflector strip.

23. A cleaning apparatus in accordance with claim 19, wherein:
said additional part is formed as a receptacle for a detergent.

24. A cleaning apparatus in accordance with claim 20, wherein:
said additional part is formed as a receptacle for a detergent.

25. A cleaning apparatus in accordance with claim 21, wherein:
said additional part is formed as a receptacle for a detergent.

26. A cleaning apparatus in accordance with claim 22, wherein:
said additional part is formed as a receptacle for a detergent.

27. A vehicular window cleaning apparatus, comprising:
a windshield wiper assembly including a wiper arm-and-blade;
an additional part for intensifying the cleaning effect of said wiper blade;
a coupling for coupling said additional part to said assembly, said coupling comprising a spring loaded structural unit which acts upon at least one of said wiper arm-and-blade assembly and said additional part;
an adjusting element for operating said coupling to selectively couple and uncouple said additional part to said assembly;
an actuator operable by said adjusting element;
the spring force of said spring loaded structural unit being only so great, that it can be overcome with the release of the coupling action by a change in the position of said actuator;
an axle mounted on said additional part and extending in the longitudinal direction of said wiper arm-and-blade assembly;
said structural unit comprising a two-armed catch rotatable about said axle and a spring supporting a first arm of said catch on said additional part, said first arm having a hooked end and adapted to lockingly engage said wiper arm-and-blade assembly; and
a tappet displaceable by said adjusting element, the second arm of said catch being movable by said tappet in a direction opposite to the direction of force of said spring.

28. A cleaning apparatus in accordance with claim 27, wherein:
said second arm is pressed upward by said tappet when said additional part is not operated; and
wherein said tappet is displaced downwardly for the purpose of coupling.

29. A cleaning apparatus in accordance with claim 27, comprising:
an electromagnet for displacing said tappet.

30. A cleaning apparatus in accordance with claim 28, wherein:
said additional part has a wedge-shaped, elevated portion, which faces said wiper arm-and-blade assembly with a surface tapering off toward the latter and that, for the purpose of coupling, a portion of said wiper arm-and-blade assembly is drawn across said surface.

31. A cleaning apparatus in accordance with claim 30, wherein:
said wiper arm-and-blade assembly has a rod-shaped wiper arm end onto which said wiper blade is articulated, and wherein said catch grips below said rod-shaped end.

32. A cleaning apparatus in accordance with claim 30, wherein:
said wiper arm-and-blade assembly comprises a supporting yoke system to guide the wiper rubber; and
said catch grips below one yoke of said supporting yoke system.

33. A cleaning apparatus in accordance with claim 31, wherein:
the lower end of the wiper rubber stands a predetermined distance above a vehicle part.

34. A cleaning apparatus in accordance with claim 37, wherein:
said wiper blade is articulated lateral to said wiper arm.

* * * * *